Figure 2:
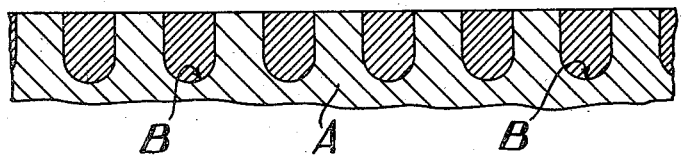

Nov. 25, 1947.    H. SHAW    2,431,430
BEARING AND BEARING SURFACE
Filed Dec. 12, 1939

Patented Nov. 25, 1947

2,431,430

UNITED STATES PATENT OFFICE 2,431,430

BEARING AND BEARING SURFACE

Harry Shaw, Rochdale, England

Application December 12, 1939, Serial No. 308,848
In Great Britain December 13, 1938

8 Claims. (Cl. 308—239)

This invention relates to bearings and bearing surfaces by which terms are meant any surfaces which are subjected to sliding contact with some other object and in particular the invention is concerned with bearings which are used for supporting rotating shafts, pistons, piston rings, engine cylinder walls, valve guides and the like.

Bearings as generally constructed consist of a strong rigid backing upon which a surface of softer bearing metal is applied. According to the present invention, when making a bearing of this type, instead of applying the bearing metal to the whole surface of the more rigid backing the backing is so constructed as to form a matrix for supporting the bearing metal at a multiplicity of positions on the surface so that the bearing metal is bordered by the metal of the more rigid backing element.

The bearing metal may be any desired metal such as tin, lead, zinc, cadmium or alloys of such metals, while the matrix holding the bearing metal is metal such as copper, steel, silver or their alloys, of greater strength and/or greater heat conductivity than the bearing metal.

The surface of the metal which is to form the matrix is rendered porous or pitted by any suitable means such as machining, etching or by electro-chemically depositing the matrix metal, controlling the process so as to give a pitted surface.

The bearing metal may be loaded into the pores or pits in the matrix by any suitable method such as casting, electro-chemical deposition, deposition from the vapour phase by processes such as stannising in the case of tin, by cementation processes of the sherardising type in which the object to be treated is packed in metallic dust and heated in a sealed container, or by depositing the metal by metal spraying using any metal spraying process such as those using the metal in powder, molten or wire form or by a combination of any of these processes.

In the practical carrying out of these processes it may be convenient to deposit more bearing metal than that necessary to fill the pits or pores. The surplus being then removed by machining or any other convenient process.

The surface treated and loaded with bearing metal in the manner described is not intended to form the basis for the casting of a body of bearing metal, but the bearing metal in the pores or pits forms the actual bearing metal.

It may be convenient when using certain bearing and matrix metals to machine a surface of the metal which is attached to a mass of matrix metal so as to leave island projections of bearing metal and then form round these a matrix of a different metal of greater strength and/or greater heat conductivity by any suitable method as, say, electro-chemical deposition.

The metal forming the matrix round the bearing metal may take the form of a layer on another material as for instance copper or silver on a steel surface, the copper or silver being pitted and filled with bearing metal.

The bearing surface may be in its final shape before the pitting and filling of the pits with bearing metal is carried out or it may be in flat form when this is done, being later shaped to its final form. This latter condition would apply to the so called "strip" bearing in which the bi-metal strip of, say, steel and copper would have its copper face pitted and filled with bearing metal, say, tin, and then the strip be bent and shaped to form the final bearing.

Where it is desired to make the bearing integral with the piece, say a connecting rod, the matrix metal would be deposited by any suitable means into the bore of the connecting rod, machined to a regular surface, pitted by any suitable means as say knurling with a spiked roll or knurl, and then the pits would be filled with bearing metal. The connecting rod might be steel, the matrix metal copper and the bearing metal, say, tin. On the other hand the bore of an aluminium alloy connecting rod might be pitted directly into the aluminium alloy and these pits filled with, say tin.

The finished surfaces of piston rings and pistons may be pitted and filled with bearing metal, the pitting being done directly into the parent metal of the ring or piston.

Figure 1:
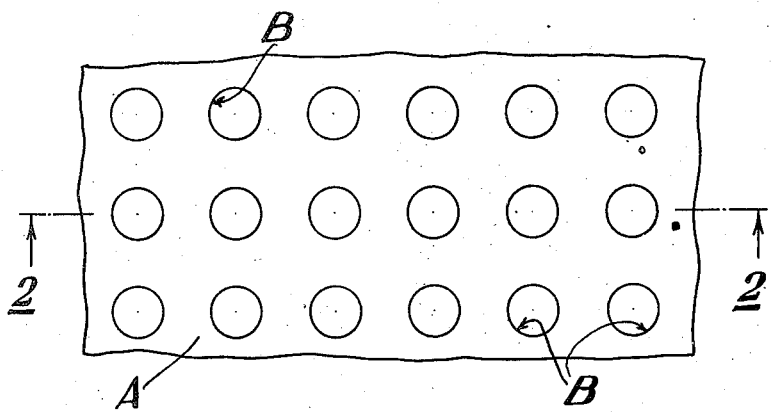

In the accompanying drawings I have illustrated diagrammatically and to an enlarged scale the preferred form of my invention. Figure 1 being a fragmentary plan view and Figure 2 a section on the line 2—2 of Figure 1.

Referring to these drawings A designates the matrix of a bearing surface. This matrix which is of copper or silver, for example, is covered with circular pits B about five thousandths of an inch in diameter and about seven thousandths of an inch deep and spaced from five thousandths of an inch apart. These pits may be provided, in any suitable manner, for example, by rolling a knurl or spiked roll over the surface. The bearing metal, tin, for example, is electro-chemically or otherwise deposited onto the surface so as to completely fill the pits and cover the whole surface with the bearing metal, and then the excess metal is removed from the surface by machining until the copper or silver between the pits just appears. A surface prepared in this way has the low frictional properties of tin, its low abrasive action, its low melting point which will allow melting out of the metal before seizure, together with the mechanical strength and high heat conductivity of the copper or silver or other metal forming the matrix.

The metal which for one application forms the matrix metal of the bearing may in another bearing for another application form the bearing metal proper. For instance the matrix metal of one bearing may be silver and the bearing metal tin, whereas in another bearing the silver may form the bearing metal in a matrix of steel.

Those practised in the art of joining one metal to another know that it is often an advantage or even necessary to introduce a thin layer of a third material to assist the bonding, so such a thin layer of another material may be used to assist the bonding of the bearing metal to the matrix, this being the obvious use of a known art.

What I claim and desire to secure by Letters Patent is:

1. A bearing comprising a solid base matrix having a multitude of closely adjacent minute pits in the surface only thereof filled to the same level as the matrix about said pits with a metal of different character than said matrix.

2. A bearing comprising a solid base matrix having a multitude of closely adjacent, minute pits in the surface only thereof, said pits being of an order of magnitude ranging between five one thousandths of an inch to ten one thousandths of an inch in diameter and in depth filled to the same level as the matrix about said pits with a second metal having different bearing properties from said matrix.

3. A bearing comprising a solid base matrix having a multitude of closely adjacent, minute pits in the surface only thereof filled to the same level as the matrix about said pits with a metal having lower heat conductivity than the metal of the matrix.

4. A bearing comprising a solid base matrix of strong metal having a multitude of closely adjacent, minute pits throughout the surface only thereof filled to the same level as the matrix about said pits with bearing metal of less strength than the metal of the matrix.

5. A bearing comprising a solid base matrix of ore metal having projections from the surface thereof so dimensioned and arranged as to provide a multitude of closely adjacent, minute pits, and a metal differing in character from said matrix, filling the pits to the same level as the tops of and separating the projections.

6. A bearing comprising a solid base matrix of silver having a multitude of closely adjacent, minute pits in the surface only thereof filled to the same level as the matrix about said pits with tin as a bearing metal.

7. A bearing comprising a solid base matrix of copper having a multitude of closely adjacent, minute pits in the surface only thereof filled to the same level as the matrix about said pits with tin as a bearing metal.

8. The herein described method of making bearings consisting in forming upon one surface of a metal matrix, a multitude of closely adjacent, minute alternated projecting and recessed portions, over-filling said recessed portions with bearing metal, and removing the surplus bearing metal to provide a smooth continuous surface having a multitude of minute alternate areas of the metal of the matrix and the metal filling of the recesses.

HARRY SHAW.

REFERENCES CITED

The following references are of record in the file of this patent:

UNITED STATES PATENTS

| Number | Name | Date |
|---|---|---|
| 138,641 | Gwynn | May 6, 1873 |
| 497,210 | Randall | May 9, 1893 |
| 597,429 | Oldendorph | Jan. 18, 1898 |
| 1,603,470 | Johnson | Oct. 19, 1926 |
| 1,637,317 | Shoemaker | July 26, 1927 |
| 1,743,645 | Whiteley | Jan. 14, 1930 |
| 1,941,768 | Vigne | Jan. 2, 1934 |